United States Patent
Mao et al.

(10) Patent No.: US 11,748,213 B2
(45) Date of Patent: Sep. 5, 2023

(54) MULTIPLE OPERATION MODES IN BACKUP OPERATOR

(71) Applicant: SAP SE, Walldorf (DE)

(72) Inventors: Kathrin Mao, Berlin (DE); Martin Brunzema, Berlin (DE); Paul Beck, Berlin (DE); Henrik Hempelmann, Havelberg (DE); Anne Roessiger, Berlin (DE); Florian Geckeler, Berlin (DE)

(73) Assignee: SAP SE

( * ) Notice: Subject to any disclaimer, the term of this patent is extended or adjusted under 35 U.S.C. 154(b) by 80 days.

(21) Appl. No.: 17/453,933

(22) Filed: Nov. 8, 2021

(65) Prior Publication Data
US 2023/0147133 A1    May 11, 2023

(51) Int. Cl.
*G06F 11/14* (2006.01)
*G06F 11/30* (2006.01)
*G06F 9/48* (2006.01)

(52) U.S. Cl.
CPC ........ *G06F 11/1469* (2013.01); *G06F 9/4881* (2013.01); *G06F 11/3017* (2013.01)

(58) Field of Classification Search
CPC . G06F 11/1469; G06F 9/4881; G06F 11/3017
USPC .......................................................... 714/15
See application file for complete search history.

(56) References Cited

U.S. PATENT DOCUMENTS

| 2018/0253481 | A1* | 9/2018 | Heidel | G06F 16/275 |
| 2020/0409738 | A1* | 12/2020 | Naidu | G06F 3/0608 |
| 2021/0303415 | A1* | 9/2021 | Brunzema | G06F 11/1469 |

* cited by examiner

*Primary Examiner* — Yair Leibovich
(74) *Attorney, Agent, or Firm* — Buckley, Maschoff & Talwalkar LLC

(57) ABSTRACT

Some embodiments include a system, method, and non-transitory medium, with the system including a plurality of database services; and a stateless backup operator to perform a first mode for each database service to reconfigure a current backup state of each database service with an associated desired backup state information for the respective database service and the stateless backup operator to switch to and perform a second mode for a specific one of the plurality of database services in response to a request execute a first backup operation for the specific database service.

17 Claims, 8 Drawing Sheets

MULTIPLE OPERATION MODES IN BACKUP OPERATOR

BACKGROUND

An enterprise may use a Database Management System ("DBMS") to handle a substantial number of database transactions. This may be the case, for example, when a database management system is used by software companies, financial services businesses, e-commerce websites, Human Resource ("HR") departments, etc. Moreover, a DBMS such as a Relational DBMS ("DBMS") and/or Database as a Service ("DBaaS") may periodically store backup information. In the event of an error with the database, information can be restored or recovered to a prior known state.

There are disadvantages, however, to this typical approach. For example, an error that occurs during operation of the database is typically detected using sophisticated monitoring concepts. Once detected, the error is fixed manually. Often, the type of error might be associated with a system misconfiguration (e.g., an incorrect buffer size or amount of memory). Some of these types of errors might be detected and corrected by a reconfiguration of the relevant database service settings and parameters. However, some other errors and contexts might be more complex to detect and rectify.

Accordingly, it would therefore be desirable to handle a wide variety of backup and recovery operations or modes of operation in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
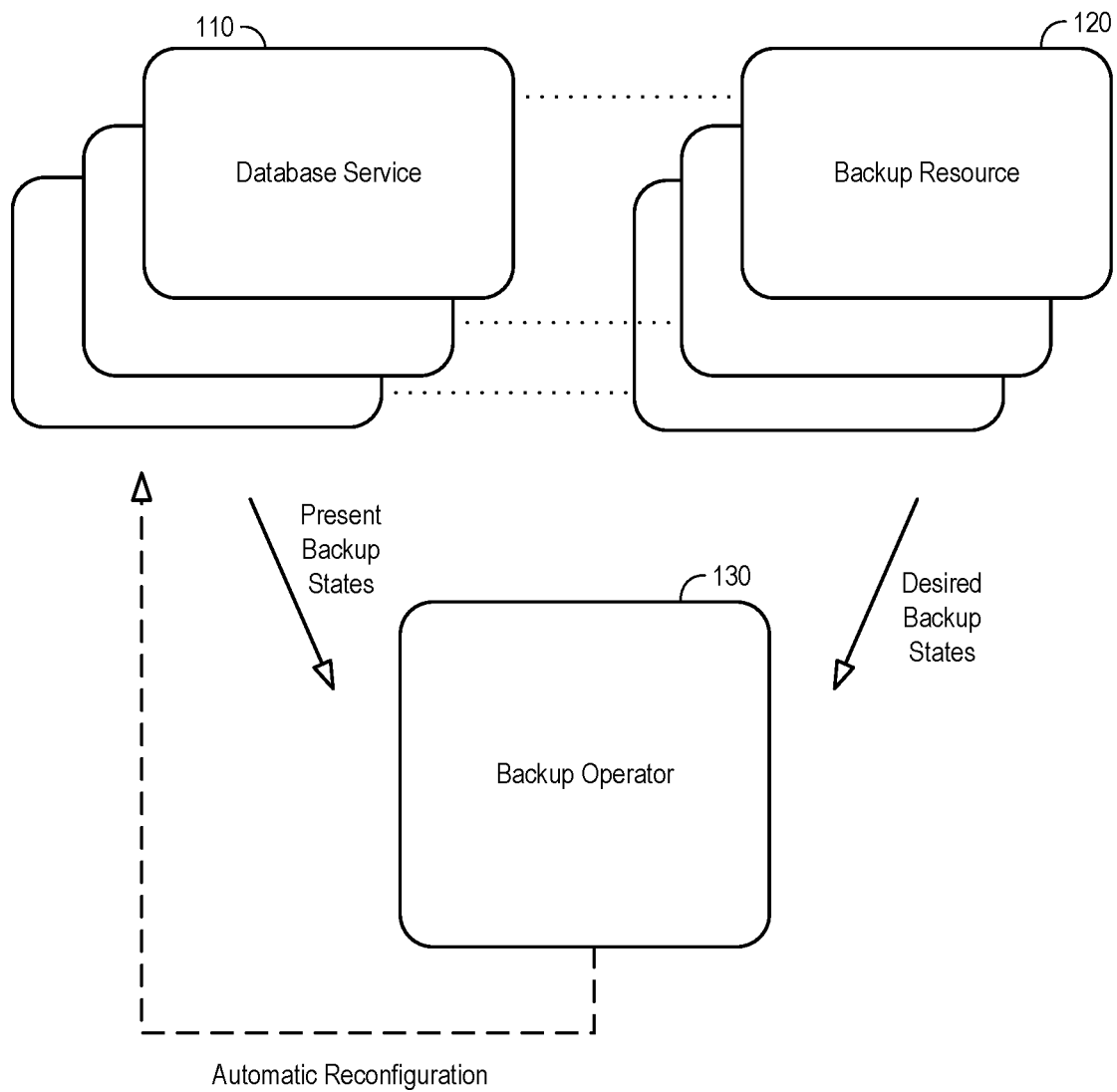
FIG. 1 is a block diagram of a system to manage DBMS backups and recoveries.

Provided herein are system, method and/or computer program product embodiments, and/or combinations and sub-combinations thereof, to manage DBMS backups and recoveries in a secure, automatic, and accurate manner. For example, FIG. 1 is a block diagram of a system 100 to manage DBMS backups and recoveries according to some embodiments. The system 100 includes a plurality of database services 110 and, for each database service, a database backup resource 120 that specifies desired backup state information (e.g., configuration information associated with backup and/or recovery operations). According to some embodiments, the plurality of databases in the system 100 is associated with a hyperscaler environment.

A stateless backup operator component 130 may compare a present backup state of each database service 110 with the associated desired backup state information (e.g., as read from the backup resource 120). In an instance a mismatch is identified between the present backup state of a database service 110 and the associated desired backup state information for that database service, the stateless backup operator component 130 automatically reconfigures that database service 110 in accordance with the desired backup state information (as illustrated by the dashed line in FIG. 1).

Figure 2:
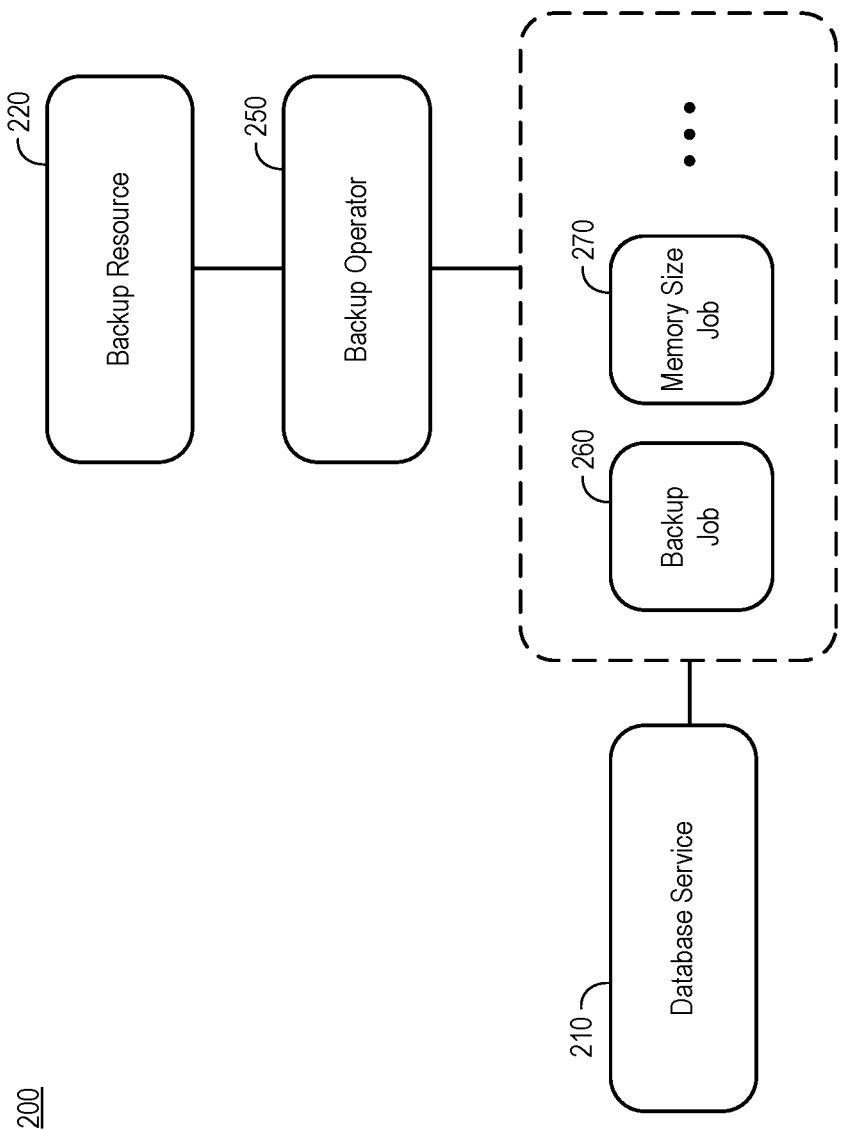
FIG. 2 is a high-level block diagram of a system architecture associated with a DBMS of FIG. 1.

FIG. 2 is a high-level block diagram of a system 200 (e.g., a hyperscaler environment) architecture associated with a DBMS in accordance with some embodiments. As with system 100, system 200 includes a plurality of database services 210 and a database backup resource 220 for each database service that specifies desired backup state information (e.g., configuration information associated with backup and/or recovery operations). According to some embodiments, backup resource 220 includes a human-readable structured document. This human-readable structured document might, for example, let an operator or administrator quickly review a set of requirements to identify for potential problems therein.

An executable backup operator 250 may compare a present backup state of each database service 210 with the associated desired backup state information (e.g., as read from the backup resource 220). In the event a mismatch is identified between the present backup state of a database service 210 and the associated desired backup state information for that database service, that database service 210 is automatically reconfigured by the backup operator 250 in accordance with the desired backup state information. In particular, the backup operator 250 may arrange to execute a backup job 260 or other database operations (e.g., memory size job 270).

Figure 3:
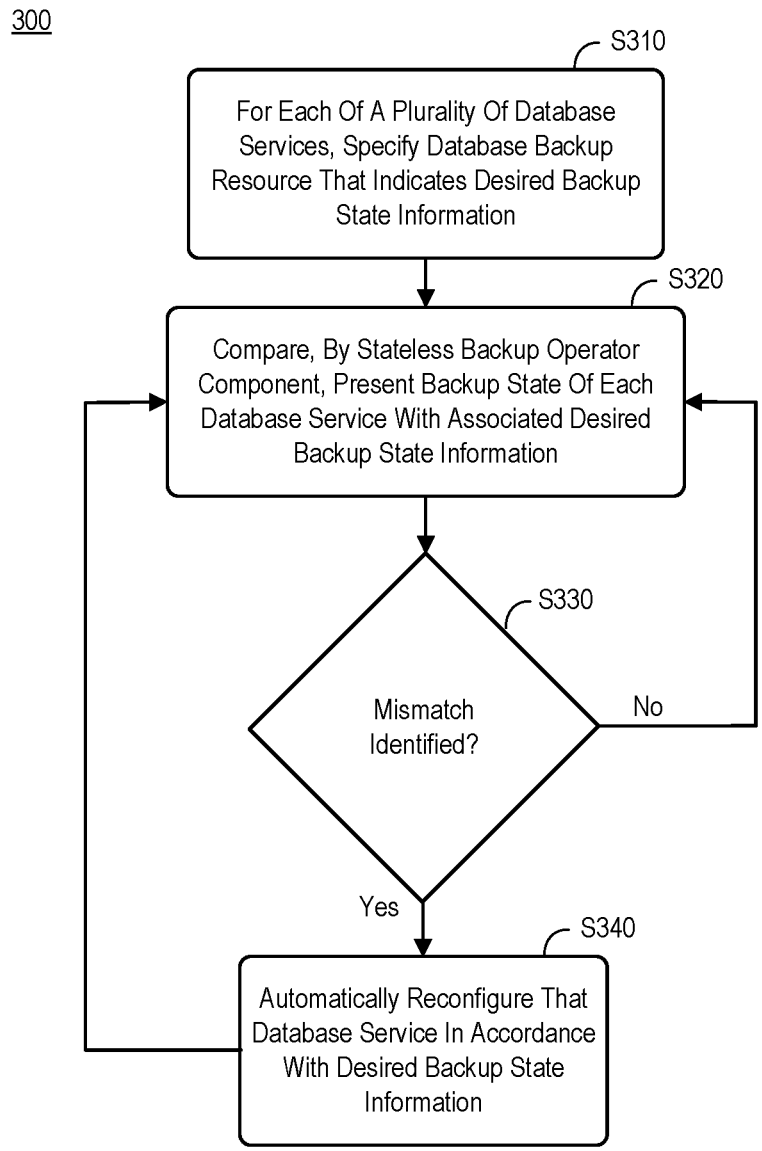
FIG. 3 is a DBMS backup and recovery management process related to the DBMS of FIG. 1.

FIG. 3 is a process 300 that might be performed by some or all of the elements of an embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

For each of a plurality of database services, at S310 the system may specify a database backup resource indicating desired backup state information. Examples of desired backup state information might include data associated with a buffer size, a default size, a schedule (e.g., a time of day or day of week), an amount of memory, database key information, etc. According to some embodiments, the desired backup state information might be associated with a Recovery Point Objective ("RPO") of a database Service Level Agreement ("SLA"). As used herein the phrase "RPO" might refer to a maximum targeted period in which data (e.g., transactions) might be lost from an Information Technology ("IT") service due to a disaster or other major incident. Similarly, the desired backup state information could be associated with a Recovery Time Objective ("RTO") of a database SLA. As used herein the phrase "RTO" might refer to a targeted duration of time and a service level within which a business process is to be restored after a problem is detected.

At S320, a stateless backup operator component may compare a present backup state of each database service with the associated desired backup state information. In some embodiments, the stateless backup operator component periodically performs the comparison in regular intervals (e.g., every five minutes, once per day, etc.). Note that the stateless backup operator component could be scaled up responsive to a load increase.

In the event no mismatch is identified between the present backup state of a database service and the associated desired backup state information at S330, process 300 may continue at S320. When a mismatch is identified between the present backup state of a database service and the associated desired backup state information at S330, the system may automatically reconfigure that database service in accordance with the desired backup state information at S340 and process 300 may then continue at S320. In some embodiments, the stateless backup operator component could be restarted responsive to a failure without impacting the availability of an associated database service.

Figure 4:
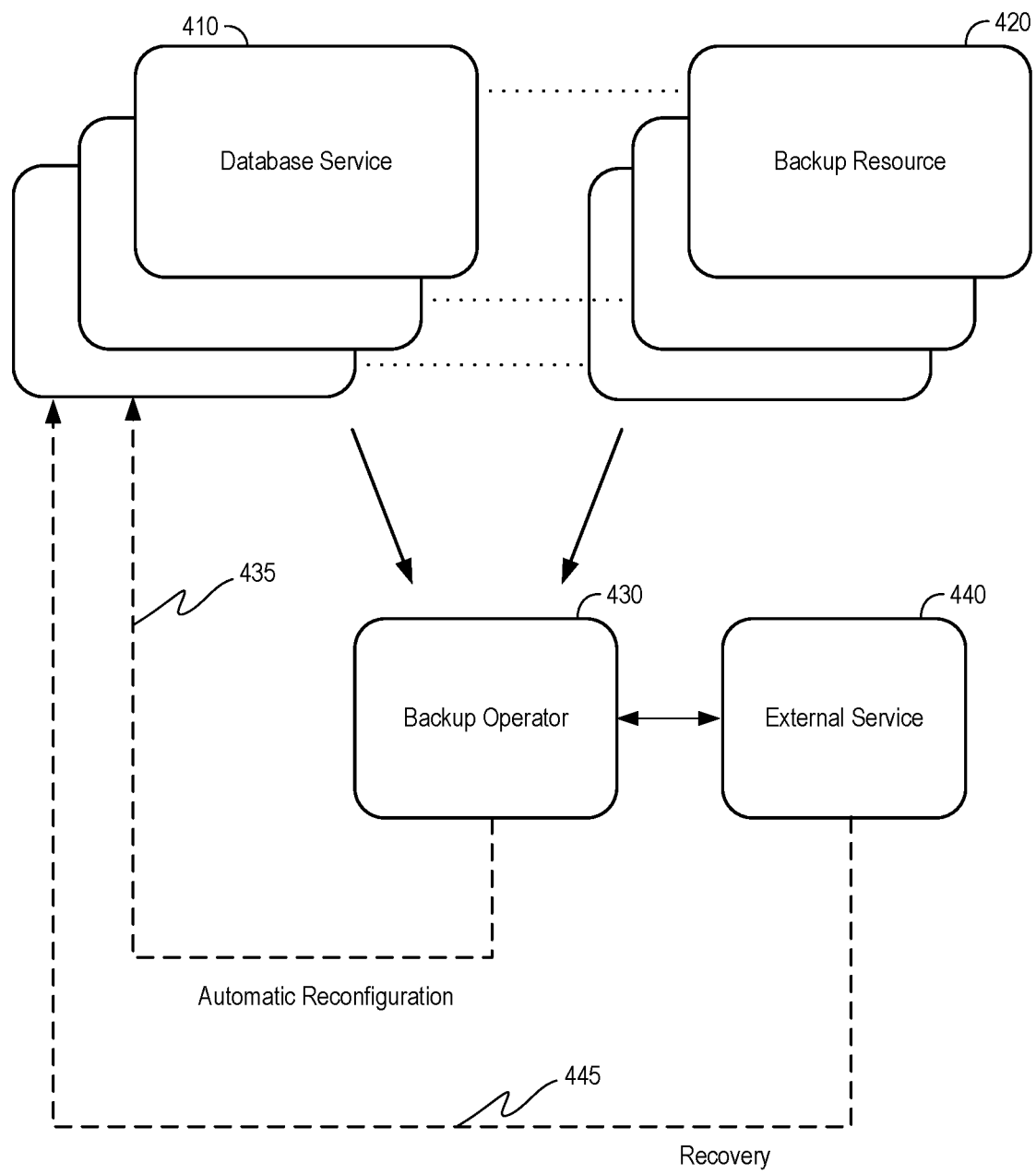
FIG. 4 is an illustrative example of a system architecture associated with a DBMS, in accordance with some embodiments.

FIG. 4 is a block diagram of a system 400 to manage DBMS backups and recoveries according to some embodiments. System 400 includes a plurality of database services 410 and, for each database service, a database backup resource 420 that specifies desired backup state information (e.g., configuration information associated with backup operations). According to some embodiments, the plurality of databases in the system 400 may be associated with a hyper-scalar environment.

A stateless backup operator component 430 may, in a first mode, compare a present backup state of each database service 410 with the associated desired backup state information (e.g., as read from the backup resource 420). In an instance a mismatch is identified between the present backup state of a database service 410 and the associated desired backup state information for that database service, stateless backup operator 430 may operate to automatically reconfigure that database service 410 in accordance with the desired backup state information, as illustrated by the dashed line 435 in FIG. 4.

As illustrated in FIG. 4, system 400 is further interfaced with an external service 440. External service 440 may, in some embodiments, include a service, application, or process that performs or accomplishes a job for a database service 410 of system 400. In some embodiments, external service 440 may operate to provide a database recovery job for a database service of system 400. As an example, backup operator 430 might receive a request from a customer to reset their database service (i.e., one of the plurality database services 410 supported by system 440) to recover that specific database service to a specific prior point in time (e.g., yesterday, two days ago, last week, etc.). In response to the request, backup operator 430 may switch from the first mode for the specific database service of the customer, wherein the first mode includes the monitoring and reconciliation between the current state of the database service and the desired state for the database service and backup operator 430 further switches to a second mode. In some embodiments, the second mode includes the execution of an external process by external service 440. In one example, external service 440 may perform a database recovery operation for a database service 410.

In some aspects, the second mode might be different than the first mode that involves the monitoring and reconciliation between the current state of a database service and a desired state as described above (e.g., the system and process of FIGS. 1 and 2). The first mode might entail relatively short-lived operations, including parameter setting changes (e.g., memory configuration changes, etc.) that are performed while a database service is still running, such that the parameter setting(s) are changed without restarting the database engine of the database service and the database service operates as it did previously but with some changed parameter(s) or state(s). The first mode might continuously or at least periodically monitor and reconcile the state(s) of the database services. The second mode might include an operational process, such as a recovery operation, that involves a specific running database service be reset or extensively reconfigured. In response to a (customer) request to reset the database to the state of configuration as it was, for example yesterday, the specific database service may be turned off, a number of process steps may be performed (e.g., the execution of SQL or other database commands, etc.), all of the data corresponding to the specified prior point in time may be retrieved from an external backup storage facility or service to restore the database engine of the particular database service to the specified prior point in time, and upon completion of the recovery operation the specific database service can be restarted.

In some embodiments, a second mode might take several minutes or even hours to complete, in contrast to the short-lived operations or jobs of the first mode. In some embodiments, during the time a second mode herein is being performed, the specific database service associated with the second mode is offline and the "normal" or standard mode (e.g., the first mode) may not be performed for this offline database service. In some aspects, the database service might be viewed as being in a conflicting state during the second mode and the regular monitoring and state reconciliation of the first mode (e.g., checking whether the parameters settings match a desired setting, checking whether the current jobs are being performed, checking whether the database service is online, etc.) should be disabled. In some instances, the second mode might encompass an external process that includes, for example, resources, execution tasks, services, and applications other than or in addition to parameter or state changes internal to a database system or service. In some regards, the present disclosure, including the example system disclosed in FIG. 4, provides a backup operator that operates in multiple modes.

In some embodiments, using the example of a requested recovery process for a particular one of the database services

410 (i.e., one of a cluster of databases managed by a database management system or service), backup operator 430 may receive a request to perform a recovery process for a specific database service. In response, the backup operator may cause the recovery process of external service 440 to begin and the backup operator may further monitor the progress of the recovery process. For example, during the recovery process, backup operator 430 might monitor whether the recovery job is actually running, attempt to restart the recovery process if it stops or fails for some reason, provide an external status of the recovery process (e.g., starting, started, running, stopping, stopped, failed, succeeded, etc.), obtain and present a result (e.g., error or successful) at a termination of the recovery operation, and switch modes after termination or completion of the recovery operation from the second mode (e.g., recovery operation mode) to the first mode for the specific database service subject to the recovery process (as illustrated by the dashed line 445 in FIG. 4) that might be used for "normal" operations of the database services (i.e., a default first mode).

In some aspects, the present disclosure describes a backup operator that switches between a first mode and a second mode to illustrate some of the features and functions of a backup operator that operates in multiple modes. Note however that a backup operator within the scope of the present disclosure that operates in multiple modes is not limited to switching between two different modes. In some embodiments, a backup operator is not limited to controlling and monitoring any specific number of execution modes, unless otherwise stated.

In some aspects, the present disclosure describes a backup operator capable of switching between multiple modes, where one of the modes (e.g., the example second mode) discussed to illustrate some of the features and functions of an example of a backup operator herein is an external recovery operation. Note however that the second (or any other) mode that may be selectively monitored, switched to, and at least partially managed by a backup operator herein is not limited to being a recovery operation.

In some embodiments, a backup operator capable of switching between multiple modes might be implemented in the coding of the backup operator. For example, the functionality to switch between at least two different modes may be encoded in program code or instructions as a base function of the backup operator. In some instances, different external requests might trigger or otherwise invoke different modes.

In some embodiments, a request or instruction to a backup operator 430 to perform a second (or other identified) mode for one or more specific database services of a plurality of database services (e.g., database services 410 in FIG. 4) may commence a sequence of events including the turning off of or the suspension of a first (or otherwise identified) mode by the backup operator for the one or more specific database services associated with the request or instruction. After the sequence of events associated with the request or instruction to perform the second (or other identified) mode is completed (e.g., terminated due to a success or a failure to complete), backup operator 430 may proceed to switch (back) to the first (or otherwise identified) mode. During the period of time backup operator 430 is switched to control the second (or otherwise identified) mode for the specific one or more database services associated with the request or instruction, the backup operator may continue to monitor and at least partially manage the first (or otherwise identified) mode for all of the other database services 410 in a database landscape that it is so configured to control (e.g., a standard mode of state monitoring and reconciliation scheduled to run every, for example, hour, once every 24 hours, etc.)

Figure 5:
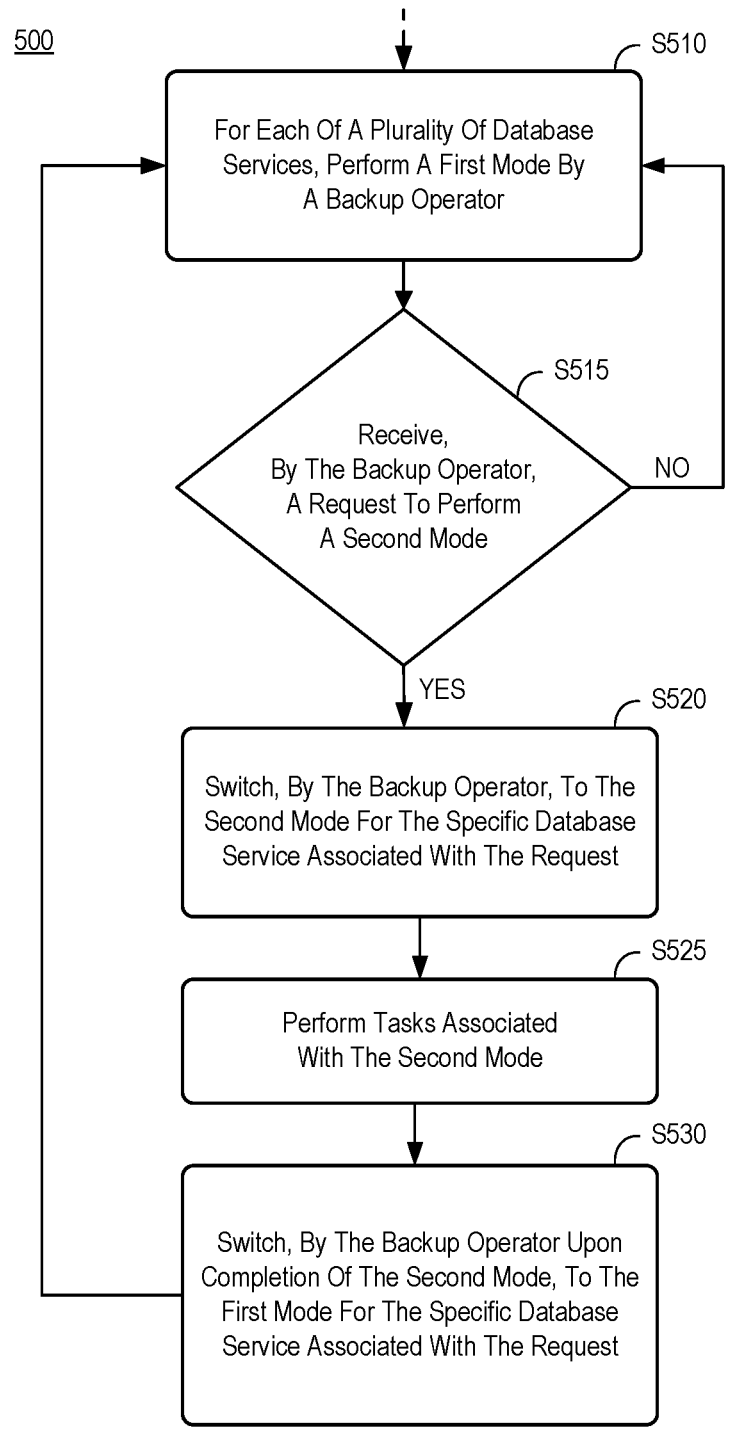
FIG. 5 is an illustrative flow diagram of a process, according to some embodiments.

FIG. 5 is an illustrative flow diagram for a process 500 that might be performed by some or all of the elements of an embodiment described herein. At S510, a database system including multiple database instances (i.e., database services) is operating (as illustrated by the dashed line pointing into operation S510). There is a backup operator (e.g., FIG. 4, backup operator 430) that handles multiple modes of operation for the plurality of databases. At operation S510, the backup operator handles a first mode (i.e., a default mode) of operation for the plurality of databases.

At operation S515, the backup operator may receive a request to perform a second mode for one or more specific database services of the database system. It is noted that the second mode is different than and distinct from the first mode. The request to perform the second mode for the one or more specific database services of the database system may be received from an entity external to the database system including, for example, a customer of database services from the provider of the database system, an external system, service or application, etc.

In the event or instance the backup operator does not receive a request to perform a second (or other) mode different than the mode currently being provided by the backup operator at S515, then process 500 may revert to operation S510 where the backup operator can continue to perform the first mode for the database services of the database system.

In the event or instance the backup operator does receive a request to perform a second (or other) mode different than the (first) mode currently being provide by the backup operator at S515, then process 500 may continue to operation S520 where the backup operator can switch to the second mode for the one or more database service(s) associated with the request received at operation S515.

Continuing to operation S525, the backup operator may proceed to perform tasks to support, facilitate, and manage aspects of the execution of the requested second mode. For instance, in an example where the request for the second mode includes a request to restore a specific database service to a particular prior point in time, the backup operator may perform a number of different tasks, including a task to extract information from the request. The extracted information could be evaluated to determine, for example, whether the request is valid request (e.g., from an authorized requestor, etc.), what is the requested recovery point in time, and other types determinations based on the extracted information (e.g., whether to delay a start of the second backup and recovery execution mode, etc.). The backup operator may also operate to create or initiate a recovery job (or other job/process depending on the received request), where the recovery (or other) job manages the requested recovery (or other) operation. Such management of the recovery (or other) job might include, for example, the generating and sending of database (e.g., SQL) statements to the database system. The backup operator may further operate to monitor the recovery operation during its execution, where the monitoring can include monitoring and reporting on relevant parameters, settings, and an overall execution status for the requested recovery (or other) operation until a completion of the requested recovery (or other) operation. The monitoring of the requested recovery (or other) operation might be periodically repeated on a fixed schedule (e.g., every 10 seconds, every minute, etc.) or some other scheduling basis (e.g., periodically repeated based, at least in part, on a workload for the backup operator, etc.) until the recovery (or other) operation is completed.

At operation S525 in response to the completion of the requested recovery (or other) operation, the backup operator may switch to the first (e.g., default or other) mode. In some embodiments, the backup operator might be tasked with generating a report documenting the failure or success of the completion of the requested recovery (or other) operation prior to or as part of the switching task at S525. Upon a successful completion of the recovery operation for the specific one or more database services, the specific database service(s) are recovered to the specified prior point in time in a known original state of the database instance with a new set of data (i.e., the data corresponding the specified prior point in time). Process 500 may revert to operation S510 after the switching of S530 so that the backup operator can continue to perform the first mode for all of the database services of the database system.

In some embodiments, the backup operator may continuously or as otherwise scheduled, monitor all of the database services other than the one or more specific database services associated with the recovery (or other) operation at S515, even during operations S520, S525 and S530. In this manner, the backup operator may provide and support a second (e.g., recovery operation or other) mode for a specified one or more database services while also providing and supporting a first (e.g., default or other) mode for all other database services managed by the backup operator.

Figure 6:
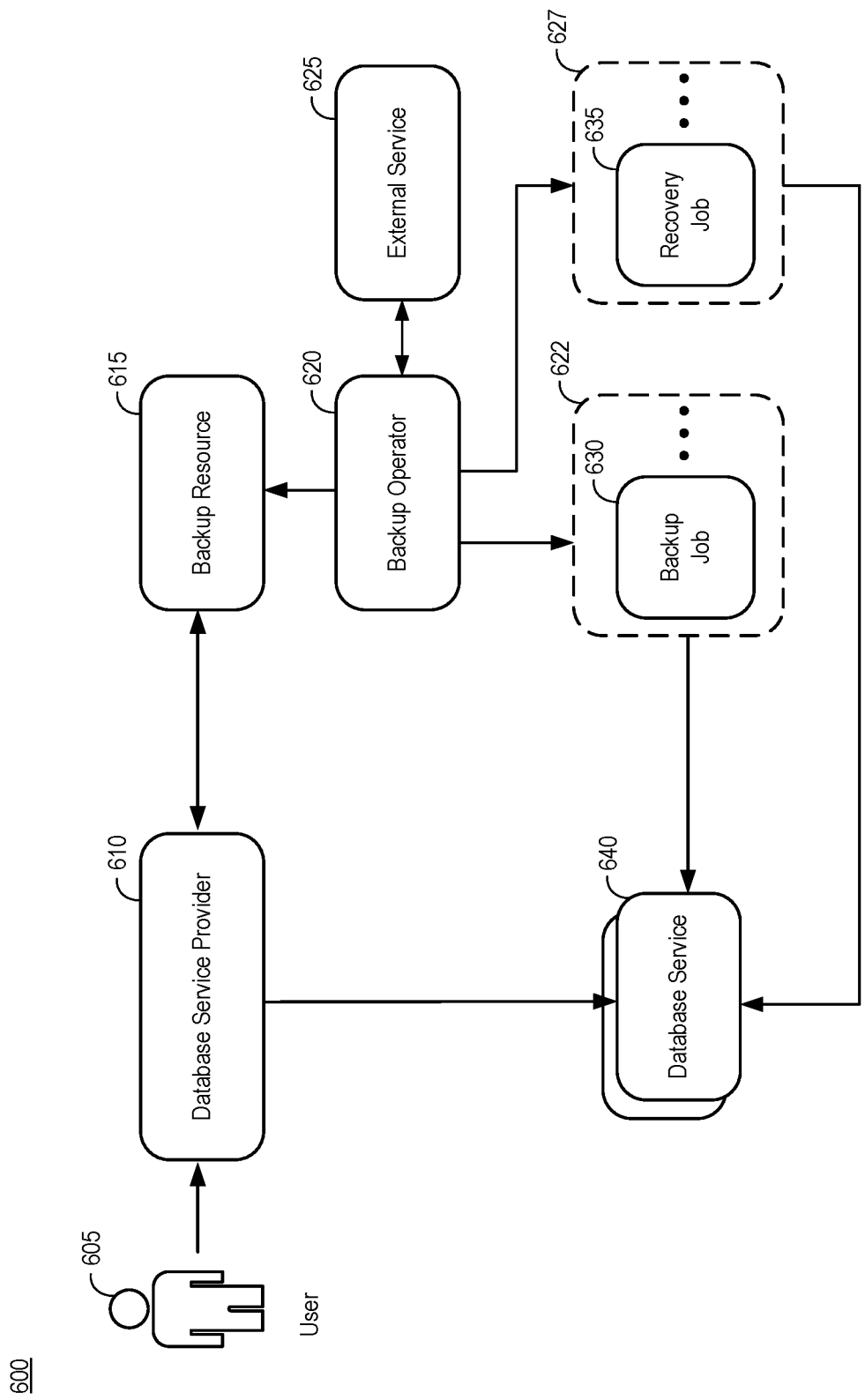
FIG. 6 is an illustrative depiction of a DBMS backup and recovery system associated with various embodiments herein.

FIG. 6 illustrates a DBMS backup and recovery system 600 associated with various embodiments herein. A user 605 may request a database service 640. A database services provider 610 may then create at least one database service 640 and at least one associated backup resource 615 in response to the request received from the user. The database backup resource 615 may specify desired backup state information, such as configuration information associated with backup and/or recovery operations.

A backup operator 620 may support and provide switching between multiple modes. One of the modes might include a monitoring and reconciliation between the current state of a database service and a desired state for the database service, whereas one of the modes might include a recovery (or other) operation. Referring to FIG. 6, backup operator 620 may provide and support a first mode 622 including the monitoring and reconciliation between the current state of database services and a desired state for the database services that is based, at least in part, on backup resources 615. The first mode 622 is performed based on the execution of backup job 630. Other executable jobs might be included in the first mode 622. Performance of the first mode 622 may result in the reconfiguration of parameters and states associated with database services 640.

Backup operator 620 may also provide and support a second mode 627. In the example of FIG. 6, second mode 627 includes a recovery operation that includes a recovery job 635 that is executed to fulfill a request for the recovery that is received from external service 625 by the backup operator. Other executable jobs might be included in the second mode 627. A successful performance of the second mode 627 may result in the reconfiguration of specific one or more settings, parameters, states, data sets, and other configuration aspects of the database services 640, in accordance with the jobs or tasks specified in the second mode 627 (e.g., recovery job 635).

Figure 7:
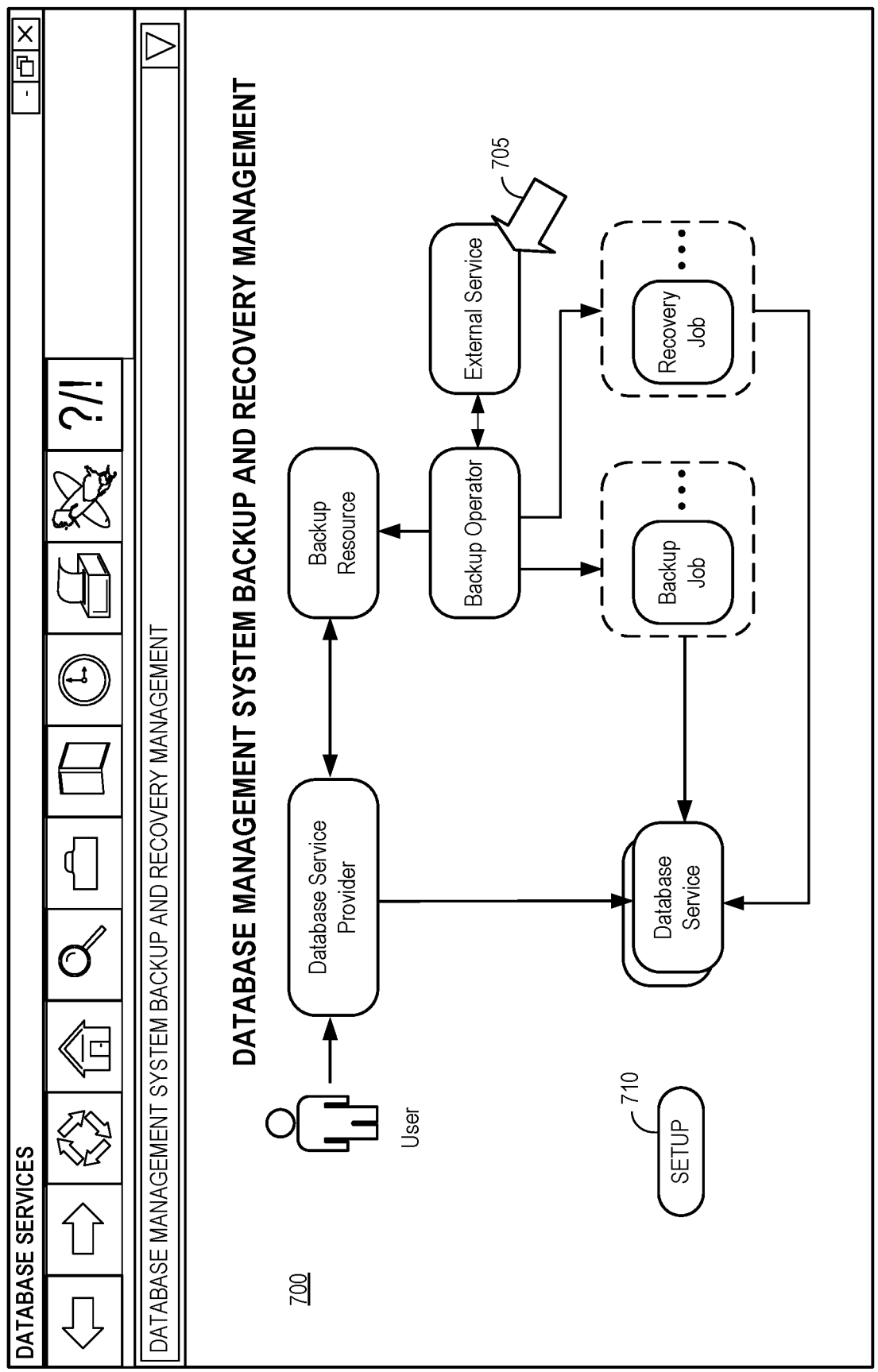
FIG. 7 is an illustrative depiction of a real-time database backup and recovery management display, in accordance with some embodiments.

FIG. 7 is an illustrative depiction of a real-time database backup and recovery management display in accordance with some embodiments. Display 700 includes numerous graphical elements representations of a backup and recovery management system including database services and a backup operator that may provide and support multiple different modes. Selection of a graphical element (e.g., via a touchscreen or computer mouse pointer 705) may provide a mechanism for an operator or administrator to view additional information about that selected graphical element (e.g., via a popup window) and/or adjust parameters associated with that element (e.g., specify a particular prior point in time for a database service recovery operation, etc.). Moreover, selection of a "Setup" icon 710 may let a user configure the specific operation of the system.

Figure 8:
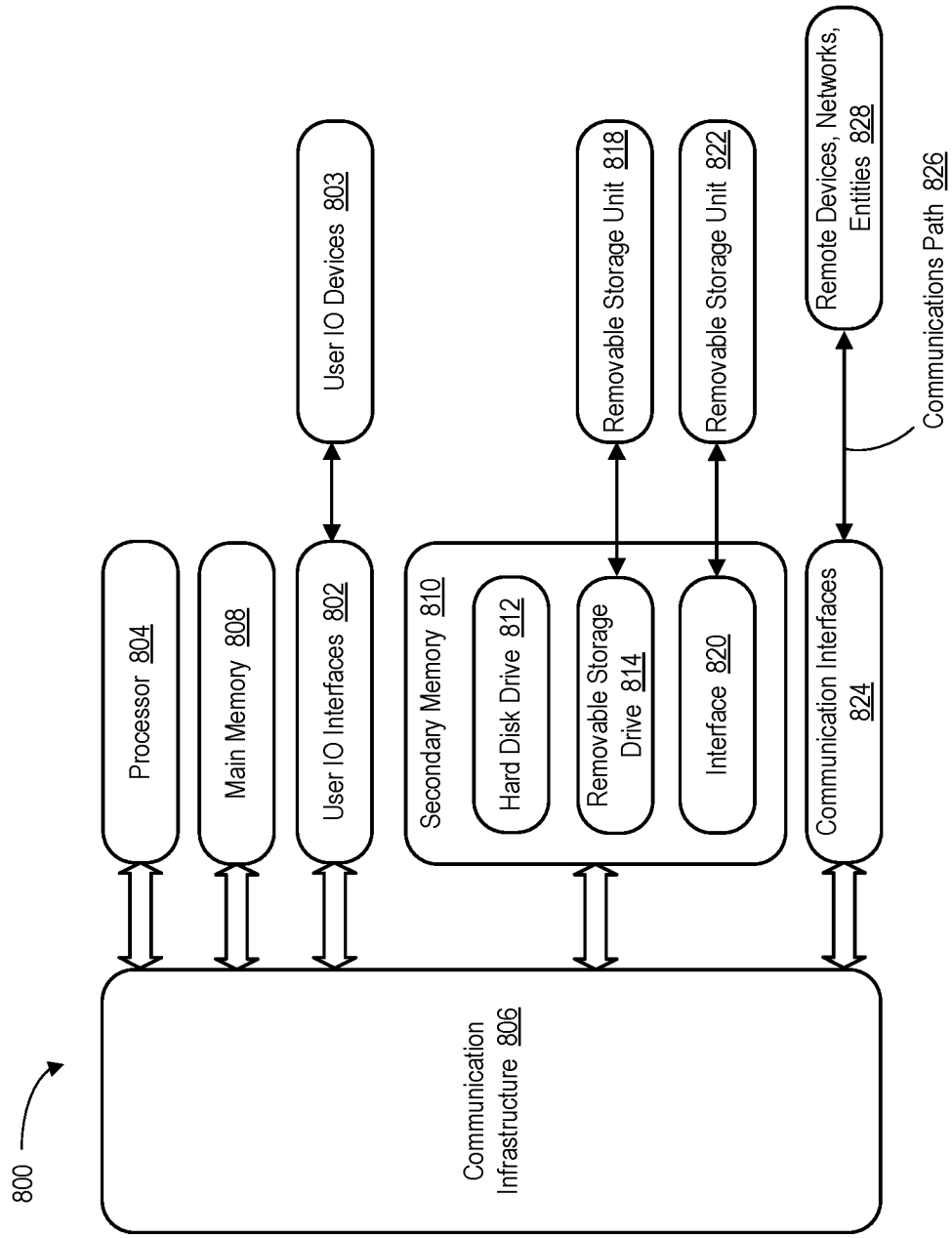
FIG. 8 is an example of a computer system useful for implementing various embodiments.

Various embodiments can be implemented, for example, using one or more well-known computer systems, such as computer system 800 shown in FIG. 8. The computer system 800 can be any well-known computer capable of performing the functions described herein. Computer system 800 includes one or more processors (also called CPUs), such as a processor 804. Processor 804 is connected to a communication infrastructure or bus 806.

One or more processors 804 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure xx06 through user input/output interface(s) 802.

Computer system 800 also includes a main or primary memory 808, such as Random-Access Memory ("RAM"). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to manage database management system backups, comprising:
a plurality of database services of a database management system;
a stateless backup operator of the database management system;
a computer processor; and
a computer memory, coupled to the computer processor, storing instructions that, when executed by the computer processor, cause the stateless backup operator to:
execute a first mode of operation for each of the plurality of database services to reconfigure a current backup state of each database service with an associated desired backup state information for each respective database service, and
in response to a request to execute a first backup operation for a specific one of the plurality of database services, switch the stateless backup operator to and execute a second mode of operation for the specific one of the plurality of database services, the stateless backup operator executes the first mode of operation for the plurality of database services other than the specific database service while the stateless backup operator executes the second mode of operation for the specific one of the plurality of database services in response to the request to execute the first backup operation for the specific database service.

2. The system of claim 1, wherein the first backup operation for the specific database service comprises a database recovery operation.

3. The system of claim 2, wherein the request includes an indication of a point in time to which to recover the specific database service.

4. The system of claim 1, wherein the request includes an indication of the specific database service.

5. The system of claim 1, wherein performing the second mode of operation comprises shutting down operation of the specific database service, executing the first backup operation for the specific database service, restoring operation of the specific database service in accordance with the executed first backup operation, and switching the stateless backup operator to and performing the first mode of operation for the specific database service upon completion of the execution of the first backup operation for the specific database service.

6. The system of claim 1, wherein the executing of the first backup operation for the specific database service includes at least one of extracting information from the request to execute the first backup operation, creating an executable job to implement the execution of the first backup operation based at least in part on extracted information, monitoring an execution of the executable job, ensuring a continued execution of the executable job, and generating a report including an indication of a state of the execution of the executable job.

7. The system of claim 1, wherein the plurality of database services is associated with a hyper-scalar environment.

8. A computer-implemented method to manage database management system backups, comprising:
receiving, by a stateless backup operator of a database management system configured to execute a first mode of operation for each of a plurality of database services of the database management system to reconfigure a current backup state of each database service with an associated desired backup state information for each respective database service, a request to execute a first backup operation for a specific one of the plurality of database services;
switching, in response to the request, the stateless backup operator from the first mode of operation for the specific database service to a second mode of operation for the specific database service; and
executing, by the stateless backup operator, the second mode of operation for the specific database service, the stateless backup operator executing the first mode of operation for the plurality of database services other than the specific database service while the stateless backup operator executes the second mode of operation for the specific one of the plurality of database services in response to the request to execute the first backup operation for the specific database service.

9. The method of claim 8, wherein the first backup operation for the specific database service comprises a database recovery operation and the request includes an indication of a point in time to which to recover the specific database service.

10. The method of claim 8, wherein the request includes an indication of the specific database service.

11. The method of claim 8, wherein performing the second mode of operation comprises shutting down operation of the specific database service, executing the first backup operation for the specific database service, restoring operation of the specific database service in accordance with the executed first backup operation, and switching the stateless backup operator to and performing the first mode of operation for the specific database service upon completion of the execution of the first backup operation for the specific database service.

12. The method of claim 8, wherein the executing of the first backup operation for the specific database service includes at least one of extracting information from the request to execute the first backup operation, creating an executable job to implement the execution of the first backup operation based at least in part on extracted information, monitoring an execution of the executable job, ensuring a continued execution of the executable job, and generating a report including an indication of a state of the execution of the executable job.

13. A non-transitory, computer-readable medium storing instructions to be executed by a processor to perform a method to manage a database management system, the method comprising:

receiving, by a stateless backup operator of a database management system configured to executing a first mode of operation for each of a plurality of database services of the database management system to reconfigure a current backup state of each database service with an associated desired backup state information for each respective database service, a request to execute a first backup operation for a specific one of the plurality of database services;

switching, in response to the request, the stateless backup operator from the first mode of operation for the specific database service to a second mode of operation for the specific database service; and executing, by the stateless backup operator, the second mode of operation for the specific database service, the stateless backup operator executing the first mode of operation for the plurality of database services other than the specific database service while the stateless backup operator executes the second mode of operation for the specific one of the plurality of database services in response to the request to execute the first backup operation for the specific database service.

14. The medium of claim 13, wherein the first backup operation for the specific database service comprises a database recovery operation and the request includes an indication of a point in time to which to recover the specific database service.

15. The medium of claim 13, wherein the request includes an indication of the specific database service.

16. The medium of claim 13, wherein performing the second mode of operation execution comprises shutting down operation of the specific database service, executing the first backup operation for the specific database service, restoring operation of the specific database service in accordance with the executed first backup operation, and switching the stateless backup operator to and performing the first mode of operation for the specific database service upon completion of the execution of the first backup operation for the specific database service.

17. The medium of claim 13, wherein the executing of the first backup operation for the specific database service includes at least one of extracting information from the request to execute the first backup operation, creating an executable job to implement the execution of the first backup operation based at least in part on extracted information, monitoring an execution of the executable job, ensuring a continued execution of the executable job, and generating a report including an indication of a state of the execution of the executable job.

* * * * *